United States Patent Office 3,538,409
Patented Nov. 3, 1970

3,538,409
STARTING ARRANGEMENT FOR A SINGLE-PHASE ASYNCHRONOUS MOTOR
Arne F. Enemark, Sonderborg, Denmark, assignor to Danfoss A/S, Nordborg, Denmark, a company of Denmark
Filed Aug. 16, 1968, Ser. No. 753,223
Claims priority, application Germany, Aug. 19, 1967, D 53,894
Int. Cl. H02p 1/44
U.S. Cl. 318—220
15 Claims

ABSTRACT OF THE DISCLOSURE

A starting arrangement for a single-phase induction motor having a capacitor of varying capacitance in series with the starting winding of the motor decreasing in capacitance during the starting of the motor to effectively take out of circuit the starting winding after a selected starting period. The capacitor has a temperature-responsive dielectric that causes the capacitor to change in capacitance.

Figure 1:
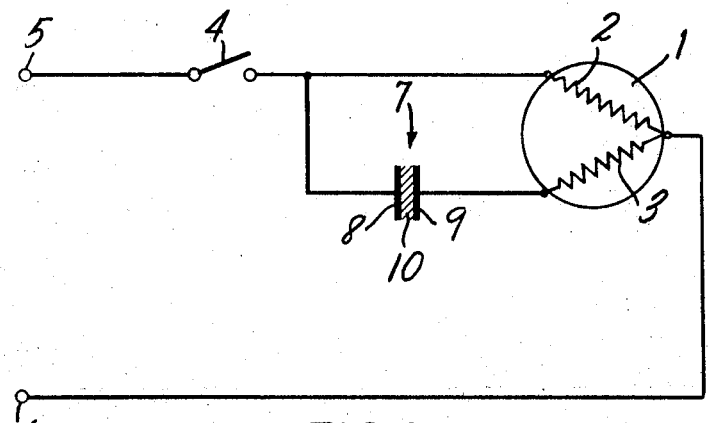

This invention relates generally to induction motors and more particularly to a starting circuit for a single-phase asynchronous motor.

It is known to use capacitors in the starting circuits of induction motors in series with a starting winding and to take the winding out of circuit after the motor has begun to run and is operating at rated speed by means of a starting switch. Starting circuits for these motors also are known in which two capacitors are connected in parallel and only one of which is taken or placed out of circuit after the motor has begun to run and is operating at normal or rated speed. In these circuits the two capacitors jointly form a starting capacitor and the capacitor that is left in circuit forms an operating capacitor. Asynchronous motors of this kind wherein there is a given capacitance in the starting circuit during starting and a smaller or lesser capacitance during actual operation of the motor have relatively high starting torque and operating torque at low current inputs. However, these circuits are expensive since the cost of the two capacitors and a switch is generally quite high.

Induction motor starting circuits are also known in which a positive temperature coefficient resistor, for example an ohmic resistor, in series with the starting winding allows current to be applied to the starting winding during the starting period of the motor and the resistor is heated either through current flow therethrough or by an external heat source so that its resistance rises to a value which for all practical purposes blocks current flow to the starting winding so that it is effectively placed out of circuit.

A principal object of the present invention is to provide a capacitative starting circuit for an induction motor which is considerably simpler than those heretofore known.

Another object of the invention is to provide a starting circuit in which a starting capacitance is provided in the starting circuit during the starting period of the motor and an operating capacitance of a lesser value is provided in the circuit after the motor is operating at normal speed and effective to "switch off" the starting winding.

According to the starting circuit of the invention a capacitor with a capacitance which decreases as temperature rises in the capacitor is connected in series with the starting winding. The heating of the capacitor during the operating or starting phase or period of the motor is such that its capacitance drops from a value corresponding to a starting capacitance to a value corresponding to an operating capacitance value.

A single capacitor is connected in the starting circuit in series with the starting winding and its capacitance is automatically regulated by current flow therethrough or by an external heating source, for example a heating resistor, so that the capacitor functions in a manner equivalent to the various type switches or arrangements of a capacitor and a switch for taking the starting winding out of circuit.

Figure 2:
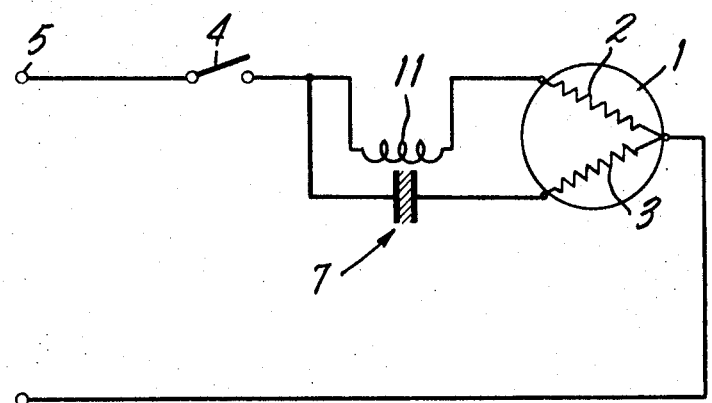

Other features and advantages of the starting circuit in accordance with the present invention will be better understood as described in the following specification and appended claims, in conjunction with the following drawings in which:

FIG. 1 is a circuit diagram of an asynchronous motor provided with a starting circuit according to the invention; and FIG. 2 is a circuit diagram of a motor provided with a second embodiment of a starting circuit according to the invention.

According to the drawings, in which like reference numerals are employed in designating alike elements, a single phase asynchronous motor 1 has a main winding 2 for normal operation and a starting winding 3 connected in a split-phase configuration. The windings are connected through a main switch 4 to supply terminals 5, 6 for connection to a power source, not shown. A starting circuit is connected to the starting winding 3 comprising a capacitor 7 in series with the starting winding and intermediate the winding and the connections to the power source for allowing current to be applied to the starting winding during the starting period and effectively blocking current flow thereto during the running of the motor.

The capacitor 7 has a varying capacitance which decreases as the temperature of the capacitor rises. The capacitor comprises two plates 8, 9 and a dielectric 10. The temperature dependence characteristic of the capacitor may be achieved primarily by the dielectric 10 changing capacitance by changing its properties with temperature. For example dielectrics of the barium titanate group or the like and other materials having a steep temperature curve may be employed. Dielectrics of this type are heated by the current flow therethrough and the changing capacitance ensues. In order to expedite the heating of the capacitor it may be encapsulated or otherwise insulated from heat dissipation thereof so that the capacitor will be readily heated in response to current flow therethrough.

Furthermore, provision may be made for heating the capacitor 7 from an external source. The capacitor may be placed in position to receive heat radiated from the motor 1. An external heating source, for example a heating resistor 11 connected in series with the main winding may likewise be used for heating the capacitor and keep it at an operating temperature as long as the main winding current flows therethrough. The heating resistor applies heat to the capacitor and continuously maintains it at its reduced capacitance level so that the starting winding is effectively maintained out of circuit.

A capacitor of varying capacitance for effectively isolating the starting winding during normal operation can for example have a starting or cold capacitance of 6 $\mu$f. and this capacitance exists when the capacitor is in a "cold" condition and upon heating of the capacitor its capacitance reduces to an operating capacitance of 1.5 $\mu$f. in which the capacitor is in a "hot" condition. Ohmic resistors can, of course, also be provided in the starting circuit in series with the capacitor if this is necessary for adapting the system to particular requirements.

The capacitor of variable capacitance may be constructed using barium titanate as the dielectric. Other dielectrics such as barium strontium titanate may be used and 95.8% barium titanate and 4.2% lanthanum are likewise usable as the dielectric. The capacitor plates can be made of vacuum plated aluminum, colloid silver or powdered nickel.

Where the capacitor is to be heated by internal heating the capacitor is encapsulated electrically insulating molded epoxy and may be similarly encapsulated for external heating but in such a case it should then be covered externally with eloxered aluminum.

It has been found that the starting arrangement above described is particularly suitable for motors that are frequently switched on and off, for example motors for small refrigeration compressors such as those found in domestic refrigerators and the like.

While preferred embodiments of the invention have been illustrated and shown it will be understood that many changes and modifications may be made within the true spirit and scope of the invention.

What I claim and desire to be secured by Letters Patent is:

1. In a starting circuit for a single-phase asynchronous motor having a main winding and a starting winding connected in a split-phase configuration, connections for connecting the motor windings to a source of power, and a capacitor connected in series with said starting winding intermediate the starting winding and said connections to a source of power for allowing current to pass to said starting winding and substantially blocking current flow thereto after said motor has started, said capacitor comprising means varying the capacitance of said capacitor from a higher value to a lower value after said motor starts to effective substantially block current flow through said capacitor.

2. In a starting circuit according to claim 1, in which said means varying the capacitance comprises a dielectric so selected that its ratio of cold capacitance to hot capacitance is at least 2:1.

3. In a starting circuit according to claim 1, in which said means varying the capacitance comprises heat-responsive means in said capacitor.

4. In a starting circuit according to claim 1, including heating means to heat said means varying the capacitance.

5. In a starting circuit according to claim 4, in which said heating means comprises a heating resistor.

6. In a starting circuit according to claim 5, in which said resistor is connected in series with said main winding.

7. In a starting circuit according to claim 1, in which said capacitor means varying the capacitance comprises a dielectric which is current-responsive and has a steep temperature characteristic curve sot hat it heats upon current flow therethrough.

8. In a starting circuit according to claim 1, in which said capacitor means varying the capacitance comprises current-responsive means.

9. In a starting circuit according to claim 8, including means insulating said capacitor against heat dissipation thereby to increase heating thereof in response to current flow therethrough.

10. In a starting circuit according to claim 1, in which said means varying the capacitance comprises a dielectric in said capacitor, said dielectric comprising barium titanate.

11. In a starting circuit according to claim 1, in which said means varying the capacitance comprises a dielectric in said capacitor, said dielectric comprising barium strontium titanate.

12. In combination, a single phase asynchronous motor having a main winding and a starting winding connected therein in a split-phase configuration, a starting circuit comprising a capacitor in series with said starting winding having a varying capacitance in operation allowing starting current to be applied to said starting winding and substantially blocking current flow to said starting winding after a period of time when said motor is started, capacitance-varying means in said capacitor varying said capacitance from a given capacitance value to a lesser capacitance as said capacitor is heated.

13. The combination according to claim 12, in which said capacitance-varying means comprises a dielectric responsive to current and heated by said current effectively decreasing the capacitance as the temperature thereof increases.

14. The combination according to claim 12, in which said capacitance-varying means comprises heat-responsive means.

15. The combination according to claim 12, including a heating element electrically energized during operation of said motor continuously heating said capacitor during operation.

References Cited

UNITED STATES PATENTS

| | | | |
|---|---|---|---|
| 2,261,250 | 11/1941 | Haddad | 318—229 XR |
| 3,303,402 | 2/1967 | Martin | 318—229 XR |

ORIS L. RADER, Primary Examiner

G. Z. RUBINSON, Assistant Examiner

U.S. Cl. X.R.

318—221, 229